Feb. 7, 1967  R. L. WILSON  3,303,082
METHOD OF BONDING POLYOLEFIN FILMS TO SHEET MATERIAL
Filed April 19, 1963
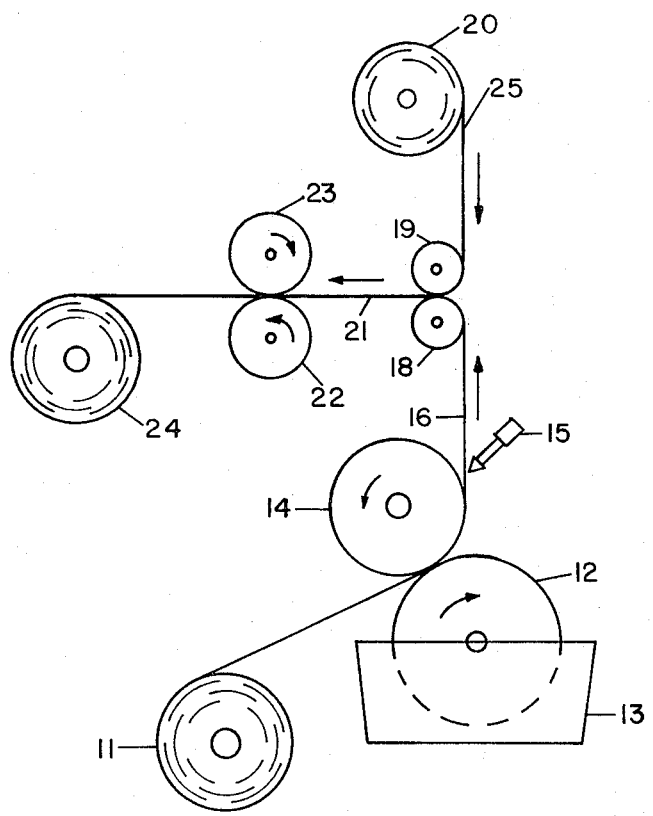
INVENTOR.
ROBERT L. WILSON
BY
W. E. McCorquodale, Jr.
ATTORNEY

3,303,082
METHOD OF BONDING POLYOLEFIN FILMS TO SHEET MATERIAL

Robert L. Wilson, Linwood, Pa., assignor to Sun Oil Company, Philadelphia, Pa., a corporation of New Jersey
Filed Apr. 19, 1963, Ser. No. 274,333
11 Claims. (Cl. 156—311)

This invention relates to a method for preparing a laminate of polyolefin film and sheet material. It also relates to a method for bonding polyolefin film to fibrous sheet material. It especially relates to the method of applying the adhesive in order to achieve a strong bond between the polyolefin film and the sheet material.

It has been heretofore known that petroleum waxes, such as the microcrystalline waxes, have been used in whole or in part as the adhesive in preparing laminations. Specifically, such a laminating wax may be employed for bonding together sheets of fibrous material, such as paper products, paper, and regenerated cellulose to form a sheet material. The sheet material will usually consist of two or more sheets of material adhered together by a film of wax intercalated in between. However, with the advent of polyolefin films, such as polypropylene and polyethylene, is has been found that these adhesives, such as microcrystalline wax, are not useful in bonding these films to sheet materials when processed according to the conventional means of preparation. Conventional laminates of these polyolefin films and sheet materials are poor in that the resulting laminate is usually dark in color and the film can be relatively easily peeled away from the sheet material.

An object of the present invention is to provide a method for achieving an excellent bond between polyolefin films and sheet material. Another object is to provide a method for preparing a laminate of polyolefin film and sheet material having intercalated therebetween conventional adhesives, such as laminating wax. A specific object is to provide a method of forming a laminate by bonding polypropylene film to sheet material with an adhesive containing petroleum wax and a specific synthetic resin.

According to the present invention an excellent bond may be obtained between polyolefin film and sheet material by first coating said film with molten laminating wax, followed by pressing the coated film onto sheet material while the petroleum wax is still in its molten state, and finally, cooling the molten wax in order to obtain a smooth, even laminate. As will become more obvious from the hereinafter discussion, it is to be noted that a good bond between a polyolefin film and sheet material cannot be obtained if the laminating wax is applied to the sheet material first rather than to polyolefin film.

As used herein, the term sheet material is intended to cover fibrous materials such as paperboard and bond paper. Also as defined herein, the term "wax" includes paraffin wax, microcrystalline wax, mixtures of paraffin wax and microcrystalline wax, and mixtures of paraffin wax and other resins such as polyethylene and the copolymer of ethylene and vinyl acetate. The term "polyolefin film" as used herein is intended to include polyethylene films, polypropylene films, and films made from the copolymerization product of ethylene and propylene. Typically, such a film will have a thickness from 0.2–5 mils.

Further, used herein, the term "laminating wax" is intended to include those wax and wax compositions referred to herein which have an adhesion value ranging from 30–120 or above. The adhesion test is performed as follows: Two strips of glassine paper, 2 inches by 6 inches, are laminated with the wax under test by pressing them mildly on a hot plate at a temperature just above the melting point of the wax. The load is adjusted to about 8 pounds of wax per ream of laminate, evenly distributed between the strips. The laminate is now held at 73° F. in an atmosphere of 50% relative humidity for one hour before testing. Adhesion is the grams pull per 2 inch width required to separate the strips by peeling.

The paraffin wax suitable for use in the present invention is a crystalline petroleum product which is removed from distillates or overhead stocks by, say, sweating or solvent extraction. Usually the paraffin wax has a melting point between 210° and 150° F. It is relatively brittle and, consequently, is easily fractured. Preferably, however, the paraffin wax component will have a relatively low melting point, for example, in the range of 125°–132° F. Normally the use of a paraffin wax as an adhesive will not be satisfactory for those purposes which require the laminate to be exposed to relatively cool temperatures, for example 40° F. or less. In general, the paraffin wax component of this invention has a melting point from 120°–150° F., a penetration at 77° F. from 5–25, a penetration at 100° F. from 10–100, and a viscosity at 210° F. from 35–45 seconds.

The microcrystalline wax component is generally high melting. Usually the melting point will be from 155°–210° F. A preferred microcrystalline wax has a melting point of from 185°–200° F., a viscosity at 210° F. of from 81–89 seconds, an average molecular weight of about 650, and a refractive index at 212° F. of from 1.435–1.438.

Another excellent adhesive comprises paraffin wax which contains a minor amount of the copolymer of ethylene and vinyl acetate. Generally, the copolymer content of such a mixture will be from 1%–50% by weight; preferably, however, the mixture comprises 20%–50% copolymer, and 80%–50% paraffin wax.

The method of copolymerizing ethylene and vinyl acetate is described for example, in U.S. Patent No. 2,200,429. Generally the copolymer or inner polymer is obtained by heating a mixture of ethylene and vinyl acetate in the presence of an oxygen catalyst at pressures from 15,000–30,000 p.s.i.g., and at temperatures of from 150°–250° C. followed by separating the resulting copolymer from unreacted monomers. The copolymer typically may be from 5–35 moles of ethylene per mole of vinyl acetate, although in some cases the copolymer may contain up to 50 moles of ethylene per mole of vinyl acetate. Usually such a copolymer will have a melt index varying from 0.5–1000.

As used herein, the melting points are determined by ASTM D87–57, penetrations of ASTM D321–57T, and viscosities (SUS—Saybolt Universal seconds) by ASTM D446–57T unless otherwise stated. All percentages are weight percent.

The preferred adhesive for the present invention is microcrystalline wax. The microcrystalline wax may be obtained by any of the methods known to the art. One especially suitable method is claimed in U.S. Patent No. 2,783,183. In general, the method of obtaining microcrystalline wax with "laminating" quality is as follows: A slack wax having from about 20% to about 50% oil is subjected to vacuum distillation to form a plurality of fractions. A selected fraction is dissolved in a hot solvent, such as a mixture of methyl ethyl ketone and benzene chilled at one selected temperature, and the precipitated wax is separated by say, filtration. The filtrate from this first step is further chilled to another selected lower temperature in the precipitated wax, separated and recovered. This sequence is repeated until the desired microcrystalline fraction is obtained.

For example, a microcrystalline wax suitable for use in the composition of this invention is prepared as follows: Slack wax containing about 30 percent oil, obtained from the dewaxing of lubricating oils, is continuously vacuum distilled at 650° F. into two distillate fractions, one being removed at about 420° F. @ 6 mm. Hg pressure, and the other at about 590° F. @ 25 mm. Hg pressure. These low boiling fractions constitute approximately 68 percent of the total charge. The high boiling residual fraction constitutes approximately 32% of the total charge and is used for the recovery of the desired microcrystalline wax. This high boiling residual fraction is dissolved in about 3.5 parts of hot (150° F.) solvent mixture comprising 53% methyl ethyl ketone and 47% benzene. The resulting wax solution is cooled to 93° F., diluted with 5.5 parts of solvent, filtered (or centrifuged) to remove the precipitated wax, and the wax is washed with 4 parts of solvent. The filtrate from the initial filtration was further cooled to 58° F., diluted with 6 parts of solvent, filtered, and washed with 4 parts of solvent. The wax product finally obtained after solvent removal has an adhesive value between 30 and 120 grams pull per 2 inch width. These adhesion values define, in general terms, the range which is necessary for a wax to be designated as having laminating quality.

It is understood that the above-recited method of obtaining the microcrystalline wax is only illustrative and any other means of obtaining a microcrystalline wax suitable for laminating purposes is equally applicable to this invention. The invention embodies the use of waxes having laminating quality and does not embody any particular method of obtaining such wax or wax blends.

A petroleum wax having laminating quality can also be obtained by blending a microcrystalline wax and paraffin wax in critical proportions. Usually the paraffin wax component will range from 5%–50% of the total wax blend. The incorporation of paraffin wax into the microcrystalline wax may be by any convenient means, such as by admixing the waxes in their molten state to obtain a homogeneous blend.

The accompanying drawing illustrates one embodiment of the present invention. Referring to the drawing a polyolefin film 17 is continuously fed from roll 11 to simultaneously contact pressure roller 14 on the upper side of the film and transfer roller 12 on the lower side of the film whereby molten laminating wax is continuously transferred from vessel 13 to the lower side of the polyolefin film in the form of a smooth uniform continuous coating by way of transfer roller 12. The coated film 16 is continuously contacted by equalizer rod 15 to regulate the wax load on the film surface. The polyolefin film containing the superficial molten wax coating is thereafter contacted and pressed at a point between pressure rollers 18 and 19 onto sheet material 25 which is continuously fed from roll 20, to continuously form the single laminated fibrous sheet 21 which passes through chill rolls 22 and 23 whereby the laminate is cooled and subsequently continuously wound on take-up roll 24.

To illustrate the method of the present invention a microcrystalline wax was prepared by the method hereinabove described. A polyolefin film such as polypropylene film having 2.0 mil thickness was continuously passed in contact with transfer rollers, i.e. rollers dipping into a bath of molten microcrystalline wax to transfer wax from the bath to the polyolefin film as a smooth uniform coating. The coated film was then contacted with a equalizer rod to regulate the wax load to 5.2 pounds of wax per ream of film. The film containing the superficial film of molten wax was maintained at a temperature at about the melting point of the wax, or slightly below, and then pressed onto sheet material, such as paper. The paper and polyolefin film having intercalated therebetween the microcrystalline wax still in its molten state was next cooled until the wax solidified. The resulting laminate is useful in preparing containers for the packaging of various goods, such as foods requiring refrigeration.

The solvent designated in the methods of preparing the wax components may be any of the known dewaxing and deoiling solvents. The preferred solvent is a mixture of methyl ethyl ketone and benzene. Either of the components of the solvent may be replaced, however, in whole or in part by other ketones, such as methyl butyl ketone or acetone, or hydrocarbons or halogenated hydrocarbons, such as ethylene dichloride, pentane, and hexane, or alcohols, such as propyl or heptyl alcohols.

It is an important aspect of the present invention that the film be coated with the wax first rather than the conventional method of placing the wax film on the paper first. As shown by the following examples the "paper first" method is unsatisfactory when compared to the "film first" method of applying the adhesive.

As another specific illustration of the present invention, a thin film of microcrystalline wax was applied to polypropylene film on the side that is to be against paper board. While the microcrystalline wax is still in its molten state, the film is placed onto the paper board by passing through rollers which firmly seal the film and the paper board with the wax bond. The laminate is next maintained at a temperature of approximately 72° F. until the wax has completely solidified. By way of comparison the following experiments were performed using polypropylene as the "film" and a microcrystalline wax as the "adhesive":

| Experiment No. | Method of Applying Adhesive | Bond Strength[1] | Wax Consumption, gram per sq. inch |
|---|---|---|---|
| 1 | Paper first | No bond | 0.04 |
| 2 | do | do | 0.015 |
| 3 | do | do | 0.012 |
| 4 | do | do | 0.016 |
| 5 | Film first | Excellent bond[2] | 0.003 |
| 6 | do | do | 0.004 |
| 7 | do | do | 0.009 |

[1] Determined in exactly the same manner as the standard adhesion test.
[2] Tear Seal.

The above data clearly demonstrates that if the laminating adhesive is applied to paper board first, then essentially no bond is obtained between the polyolefin film and the paper board. It is to be further noted that even if a good bond were to be obtained, the use of the "paper board first" method consumes many times the amount of wax which is necessary to achieve such a bond. As shown hereinabove, the "film first" method requires significantly less wax and achieves a significantly better bond than the methods heretofore known to the prior art. Using the "film first" method, the laminated article was found to have a smooth, uniform appearance, was flexible with no tendency for the film to peel off the paper board, and possessed good water vapor permeability characteristics.

I claim:
1. Method of preparing a laminate of polyolefin film and sheet material selected from the group consisting of paperboard and bond paper which comprises:
 (a) coating only said film with laminating wax;
 (b) pressing the coated film onto said sheet material while the wax coating is molten; and
 (c) cooling said molten wax thereby bonding polyolefin film to the sheet material to form said laminate.
2. Method according to claim 1 wherein said laminating wax is microcrystalline wax.
3. Method according to claim 1 wherein said polyolefin film is selected from a group consisting of polyethylene and polypropylene.
4. Method according to claim 3 wherein said polyolefin film is polypropylene film.
5. Method according to claim 4 wherein said laminating wax is microcrystalline wax.

6. Method according to claim 3 wherein said laminating wax is paraffin wax containing from 1%–50% of the copolymer of ethylene and vinyl acetate.

7. Method of bonding a film selected from the group consisting of polypropylene and polyethylene to fibrous sheet material selected from the group consisting of paperboard and bond paper which comprises the following sequence of steps:
 (a) coating said film with laminating wax selected from the group consisting of paraffin wax, microcrystalline wax, mixtures of paraffin and microcrystalline waxes, and a mixture comprising paraffin wax and 1%–50% of the copolymer of ethylene and vinyl acetate, at a temperature above the melting point of said laminating wax;
 (b) pressing the coated film onto said sheet material while the wax coating is molten; and
 (c) cooling said molten wax to a temperature at which said laminating wax is solid.

8. Method according to claim 7 wherein said laminating wax is microcrystalline wax.

9. Method according to claim 7 wherein said laminating wax is a mixture of paraffin wax and microcrystalline wax.

10. Method according to claim 7 wherein said wax is a mixture comprising paraffin wax and 1%–50% of the copolymer of ethylene and vinyl acetate.

11. Method according to claim 10 wherein said laminating wax is a mixture comprising paraffin wax and 20%–50% of the copolymer of ethylene and vinyl acetate.

References Cited by the Examiner
UNITED STATES PATENTS

| | | |
|---|---|---|
| 2,828,240 | 3/1958 | Couch et al. |
| 2,877,196 | 3/1959 | Reding. |
| 2,926,723 | 3/1960 | Clark. |
| 3,010,860 | 11/1961 | Eberl _____ 161—235 X |
| 3,025,167 | 3/1962 | Butler. |
| 3,075,864 | 1/1963 | Anderson _____ 161—235 X |
| 3,181,765 | 4/1965 | Bonzagni et al. ____ 161—235 X |
| 3,215,678 | 11/1965 | Adelman _____ 161—231 X |

EARL M. BERGERT, *Primary Examiner.*

CLIFTON B. COSBY, *Examiner.*